UNITED STATES PATENT OFFICE.

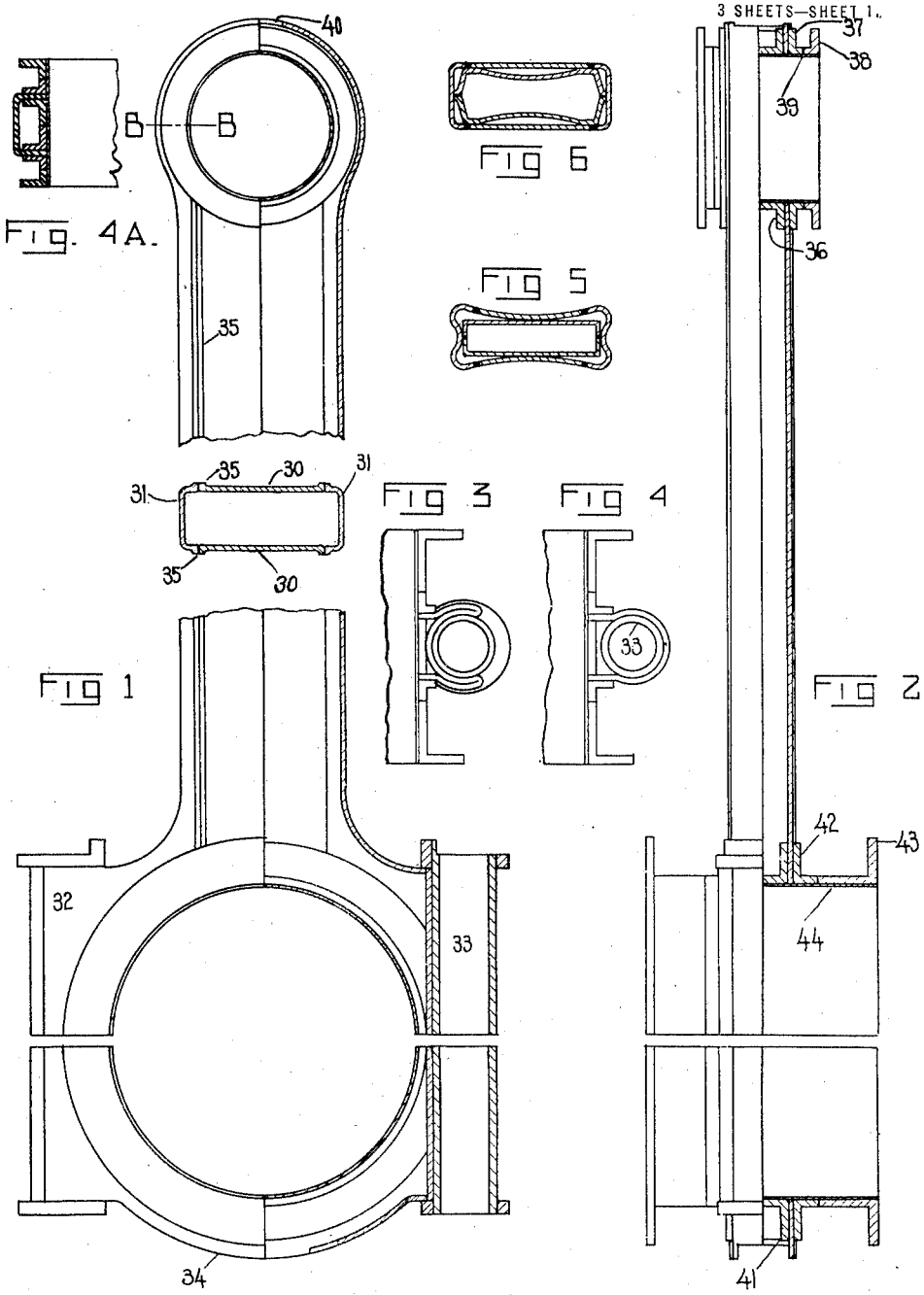

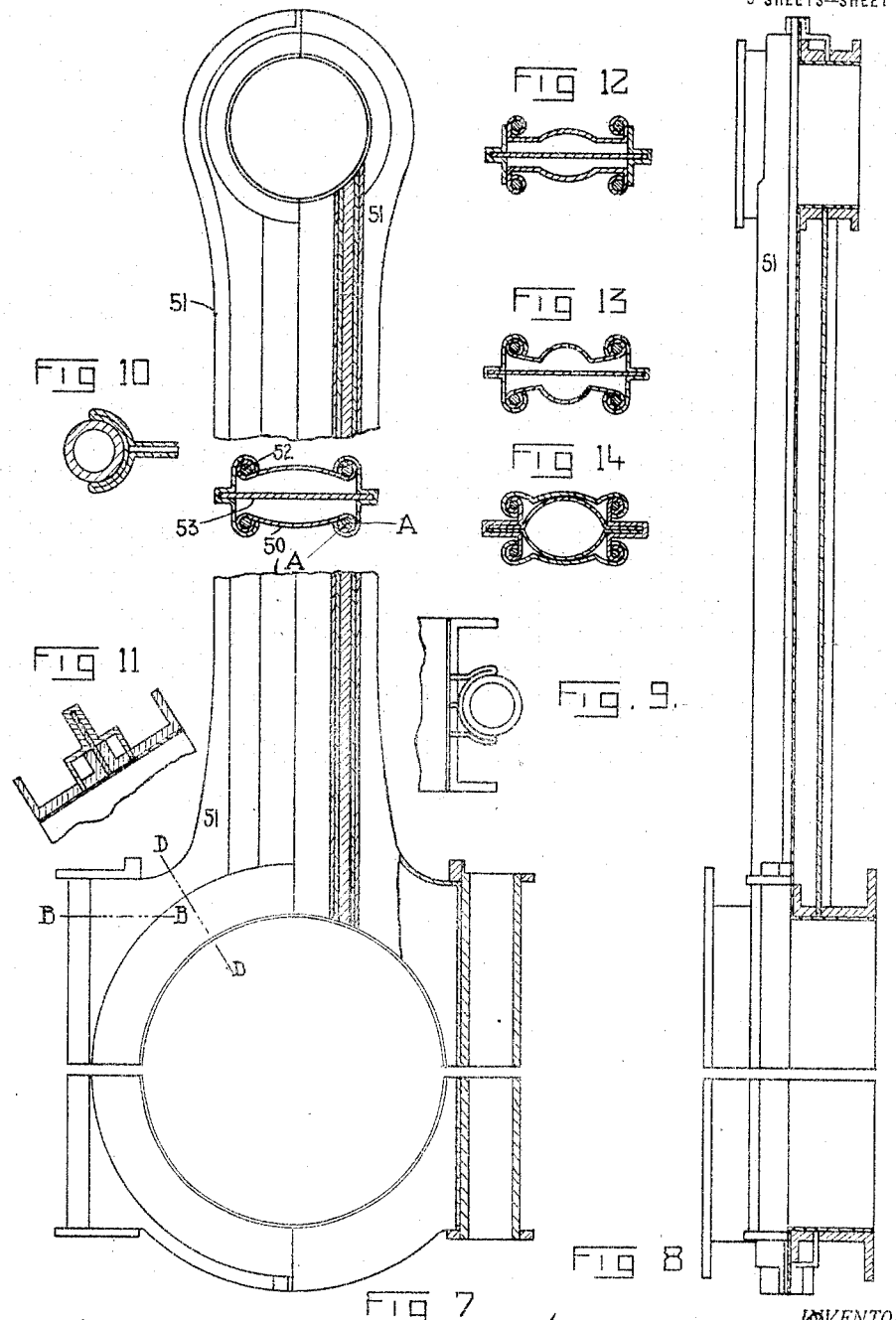

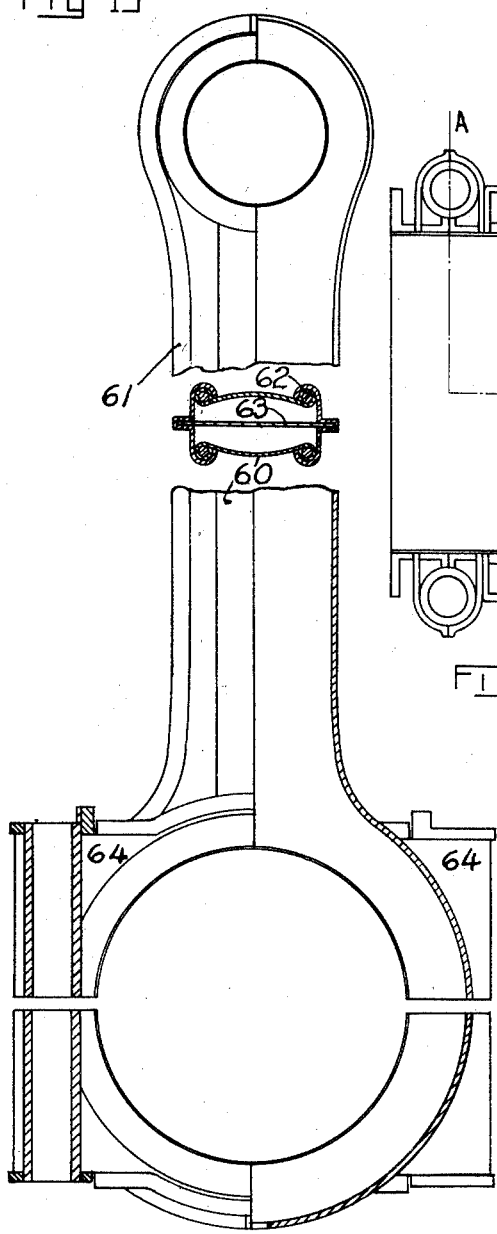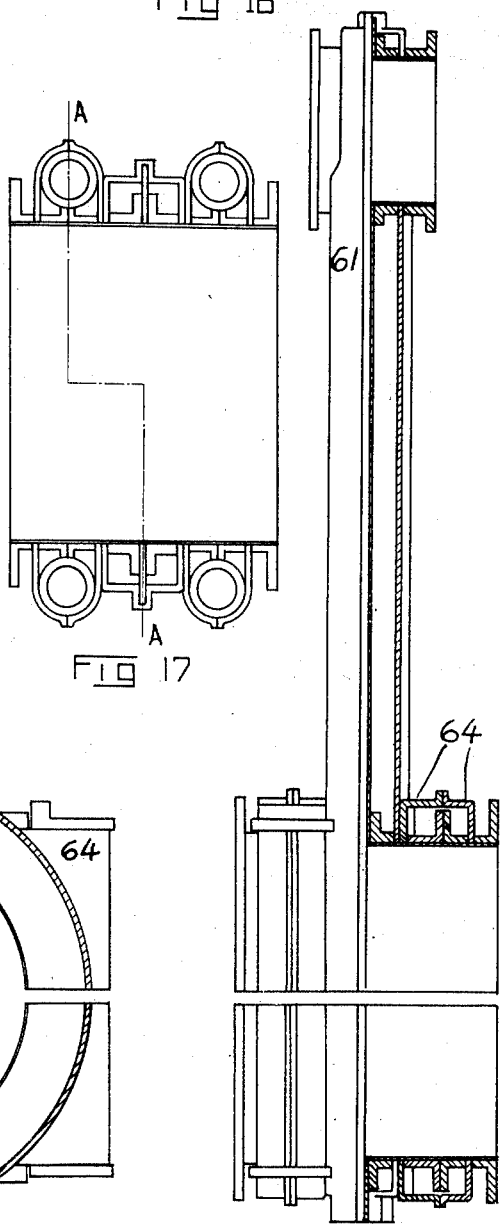

HEBRON BERNARD LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING-ROD.

1,373,083.     Specification of Letters Patent.     Patented Mar. 29, 1921.

Application filed March 22, 1917. Serial No. 156,626.

*To all whom it may concern:*

Be it known that I, HEBRON BERNARD LAYMAN, a citizen of the United States, and residing at New York, in the county of New York, and State of New York, have invented certain new and useful Improvements in Connecting-Rods, of which the following is a specification, such as will enable those skilled in the art to which it appertains to make and use the same.

This invention relates to built-up connecting rods, especially sheet metal rods. Its purpose is to provide a new and novel form of connecting rod, which will possess great strength for a given weight, and be cheap and easy to manufacture. Other objects will appear hereafter in the specification and claims.

By way of example, I show in

Figure 1 a side elevation, one-half in section, of a sheet metal connecting rod, embodying features of the invention.

Fig. 2 is an elevation, one-half in section, of the rod in Fig. 1 taken at right angles thereto.

Fig. 3 is a broken view showing the abutting face of either the rod or the cap.

Fig. 4 is a view like Fig. 3, but showing modified bolt boss construction.

Fig. 4ª is a section on the line B—B of Fig. 1.

Figs. 5 and 6 show modified forms of shank.

Fig. 7 is a side elevation of a modified form of rod, partly sectioned on the line A—A of the cross section of the shank and partly broken away.

Fig. 8 is a side elevation, one-half in section, of the rod in Fig. 7.

Fig. 9 is a view of the abutting face of either the rod or cap of Figs. 7 and 8.

Fig. 10 is a section on the line B—B of Fig. 7.

Fig. 11 is a section on the line D—D of Fig. 7.

Figs. 12, 13 and 14 show modified forms of shank which I may employ.

Figs. 15, 16 and 17 show yet another modified form of rod. Figs. 15 and 16 correspond with Figs. 1 and 2. The crank end of the rod in Fig. 15 is sectioned on the line A—A of Fig. 17. Fig. 17 is a view of the abutting face of either the rod or cap.

The shank of the rod shown in Figs. 1 to 6 inclusive is comprised of two similar sheet metal parts 30 called shank members, which extend from the crank pin boss to the piston pin boss, and two similar and oppositely disposed formed sheet metal parts 31 called body sections. These four parts together complete the hollow rectangular or box-girder shank. The body sections 31 together are shaped at one end to form a piston pin boss, as clearly shown in Fig. 4ª. At the other end, the body sections 31 are spread and formed or shaped to compose the crank pin boss. The metal in the body sections 31 adjacent to the crank boss is depressed and doubled upon itself to form a bolt boss 32, as clearly shown in Fig. 3. I may, however, form the bolt boss by shaping the metal outwardly as shown in Fig. 4 and inserting a bolt boss liner bushing 33, as shown. The cap 34 of the rod is formed integral with the rod body proper, that is to say the cap is formed solely by the downward and inward extension of the body sections 31, reinforced by the bushings hereafter referred to, and as shown the shank members 30 have nothing to do with the construction of the cap.

In the manufacture of the rod, I assemble the formed body sections 31 and the shank members 30, and preferably electrically roller-weld them together to form the joints 35 of Fig. 1. I may join the two edges of the shell in any manner, but I prefer to electrically weld them first, and then braze or fuse them as hereafter refererd to. The connecting rod shell thus constructed is apertured in one end to receive the piston pin, and in the other end to receive the crank pin.

Each side wall of the shell at and within the piston pin boss is provided with a flanged bushing or cuff 36. These cuffs abut at the center line of the rod. Exteriorly, each side wall is also provided with a flanged bushing or cuff 37. A final flanged bushing 38 completes the length of the piston pin boss. An inner liner 39, preferably of steel of different temper or hardness from that of the flanged bushings, is secured within the boss and completes the assembly thereof.

In constructing these rods, I prefer to make the bushings 36, 37 and 38 of high carbon or alloy steel of great hardness and high tensile strength. Such steel is not easily welded or machined, so in the incorporation of the inner lining 39, I provide a thin wall of softer material, preferably steel, which I use as a tubular rivet, spinning the ends over to secure the several flanged bushings to the piston pin boss.

In the course of manufacture, after all of the bushings, including those of the crank end hereafter referred to, are assembled to the rod, all of the parts are brazed or fused together by immersion in a molten alloy of metals and subsequently heat treated. Thereafter, the piston pin boss inner liner 39 is partly or completely machined away both in its diameter and at its ends.

At the extreme end of the rod the piston pin boss is provided with an aperture 40 derived in the course of fashioning the shell. This aperture serves as means for the free ingress and egress of spelter to and from the rod, in the course of the brazing or fusing referred to. This also provides an opening for oiling the piston pin, if it is desired.

The crank end of the rod is provided with flanged bushings 41, 42 and 43 and a liner bushing or tubular rivet 44, which correspond with the bushings at the piston end of the rod.

I prefer to form the cap intergral with the rod shell, and to sever it therefrom after the brazing or fusing has been done.

In Figs. 7 to 11 inclusive, the shank members 50 are seamed together with the body sections 51 by being bent or curled over wires 52 at each of the four joints. It is generally known that considering the cross section of the material, wires possess tremendous tensile strength, not equaled by the same material in any other form. I count upon the four wires to greatly reinforce the rod to withstand tension. It will be noted that these wires extend to and unite with the bushings in the crank and piston ends of the rod, and that when the parts are all fused together, these wires actually become fused with the crank and piston pin bosses.

The body sections 51 are formed with a narrow channel at the center line of the shank in Fig. 1, and into these channels I fit the edges of the flat reinforcing member 53, which extends throughout the length and width of the rod. It is not feasible to shape or form high carbon steel or certain alloy steels, but these steels possess characteristics which make them desirable material to be used where a column is in compression, as it is in this connecting rod. Such alloy or high carbon sheet steels can, however, be cut or blanked to the desired shape, and I, therefore, resort to the use of the flat reinforcing plate 53, and use in the formed body sections 51 and the shank members 50, a softer steel which can be worked to the desired shape.

By the combination of the softer materials to compose the outer shell of the rod, the wires of high tensile strength and the flat reinforcing plate of very stiff steel, I obtain a connecting rod possessing new and peculiarly valuable characteristics, yet one which may be shaped to the varying forms necessitated by the ever-advancing engineering practice.

In Figs. 15, 16 and 17 I have shown the shank members 60 and the body sections 61, the reinforcing wires 62 and the reinforcing plate 63, all disposed as in Fig. 7, but the construction of the crank end of the rod differs materially. The crank head end of the rod shell has secured to each of its side members, similar formed sheet metal bolt boss members 64, two of which together comprise one bolt boss. Where the crank pin bearing is of great width, four-bolt caps are necessary or desirable.

Heretofore I have used the word "shell" in referring to the main part of the connecting rod. By "shell" I mean the shank portion and one or both end portions integral therewith, exclusive of cap or flanged bushings, or liner bushings, or bolt boss bushings, or shank reinforcement, or similar small parts.

My use of the word "shell" will apply with equal force to connecting rods with or without caps. Rods of the latter class I have described in U. S. Patent No. 1,176,300.

Where I use the term "sheet metal" hereinafter in the claims, I wish it understood that I mean any form of metal which partakes of the nature and characteristics of sheet metal, as distinguished from castings and forgings.

Having fully described my invention, what I claim as new and desire to secure by Letters Patent, is:—

1. A connecting rod shell having a head end, comprising two substantially similar formed body sections permanently secured to two intermediate side wall members.

2. A connecting rod shell having a head end, comprising two substantially similar formed body sections permanently secured to two intermediate side wall members, and provided with a pin aperture having a liner bushing.

3. A connecting rod shell having a head end, comprising two substantially similar formed body sections permanently secured to two intermediate side wall members, and provided with a pin aperture having a liner bushing reinforced by a plurality of annular flanges.

4. A connecting rod having a sheet metal shank composed of two substantially similar formed body sections permanently secured to two substantially similar shank side wall members.

5. A connecting rod having a hollow sheet metal shank composed of two formed body sections permanently secured to two shank side wall members, and having a shank reinforcing member embraced by the whole.

6. A connecting rod having a sheet metal shank composed of two substantially similar formed body sections permanently secured to two substantially similar shank side wall members, and having a co-extensive shank reinforcing member.

7. A connecting rod having a sheet metal shank composed of two substantially similar formed body sections permanently secured to two substantially similar shank side wall members, and having a shank reinforcing member of flat metal of substantially similar profile secured to the body sections.

8. A connecting rod having a sheet metal shank composed of two substantially similar formed body sections permanently secured to two substantially similar shank side wall members, and reinforced to withstand tension by wires welded or united thereto.

9. In a connecting rod the combination of a sheet metal shank composed of two substantially similar formed body sections and two substantially similar shank side wall members, and an interior reinforcement, all brazed or fused into one unit.

10. A connecting rod having an end portion composed of two substantially similar formed body sections united to two side wall members, and adapted to be separated transversely to form a cap.

11. A connecting rod shell composed of four sheet metal parts united by a plurality of longitudinal joints, and reinforced by wires to withstand tension.

12. A connecting rod shell composed of four sheet metal parts united by a plurality of longitudinal joints, and reinforced by a plate to withstand shear and bending in the plane of crank motion.

13. A connecting rod shell composed of four sheet metal parts united by a plurality of longitudinal joints, and a reinforcement interior to said shell; all said parts being brazed or welded into one unit.

14. A connecting rod reinforced to withstand tension, said reinforcement consisting in part of a wire extending from the crank pin boss to the piston pin boss and united or fused to the rod.

15. A connecting rod having a longitudinal joint reinforced by a wire united thereto.

16. A connecting rod having a plurality of joints extending the length of the shank portion and reinforced by wires.

17. A connecting rod having a plurality of reinforcing wires secured to the shank portion thereof.

18. A connecting rod having a plurality of longitudinal joints in one side thereof.

19. A connecting rod having a plurality of longitudinal joints in one side thereof, two of which are disposed each side of the center line of the crank and piston pin bosses.

20. A connecting rod having a shank with a plurality of joints, two of which are in one side wall.

21. A connecting rod having a shank with a plurality of longitudinal joints in one side thereof, the said shank being reinforced by additional metal added to the joints.

22. A connecting rod having piston pin and crank pin bosses, and a shank with a plurality of joints in one side thereof; the said shank being reinforced by additional metal added to the joints in the form of wires, which wires also unite the piston pin and crank pin bosses.

23. A connecting rod having a shank with a plurality of joints in one side thereof, and reinforced by a plate of substantially similar profile.

24. A connecting rod having a shell provided with crank and piston pin bosses, comprising two substantially similar body sections permanently secured together at the bosses by bushings united thereto, and connected along the shank by means of an intermediate member.

25. A connecting rod having a shell comprising two substantially similar body sections united at their extremities, but in the region of the shank portion spaced apart and connected by intermediate shank members.

26. A built-up sheet metal connecting rod shell, reinforced in tension by wires.

HEBRON BERNARD LAYMAN.